United States Patent [19]

Fritz et al.

[11] 4,084,396
[45] Apr. 18, 1978

[54] ADJUSTABLE ROW SPACING FORAGE HEAD

[75] Inventors: David P. Fritz; Rex O. Weigand; Gary L. Fleming, all of Newton, Kans.

[73] Assignee: Hesston Corporation, Hesston, Kans.

[21] Appl. No.: 650,142

[22] Filed: Jan. 19, 1976

[51] Int. Cl.² ............................................. A01D 45/02
[52] U.S. Cl. ............................................ 56/98; 56/157
[58] Field of Search .................... 56/98, 119, 14.3, 60, 56/66, 102, 106, 13.5, 13.9, 53, 14.2, 157, 103; 171/61, 62

[56] References Cited

U.S. PATENT DOCUMENTS

| | | | |
|---|---|---|---|
| 1,565,189 | 12/1925 | Morgan | 56/119 UX |
| 1,901,099 | 3/1933 | Hale | 56/102 |
| 1,928,868 | 10/1933 | Poen | 56/157 |
| 1,936,760 | 11/1933 | Hitchock | 56/103 |
| 2,949,716 | 8/1960 | Thomson | 56/14.3 |
| 3,271,940 | 9/1966 | Ashton et al. | 56/119 |
| 3,496,708 | 2/1970 | Bornzin | 56/106 X |
| 3,609,948 | 10/1971 | Jones et al. | 56/14.2 |
| 3,808,783 | 5/1974 | Sutherland et al. | 56/106 |
| 3,961,466 | 6/1976 | Martin et al. | 56/14.3 |

Primary Examiner—Russell R. Kinsey
Attorney, Agent, or Firm—Schmidt, Johnson, Hovey & Williams

[57] ABSTRACT

Individual row units on the harvester, each including a crop transfer trough, cutting apparatus at the forward end of the trough, and cooperating conveyors along the trough, are independently swingable relative to one another for changing the distance between the troughs at their forward ends in accordance with the row spacing encountered in a particular field. The spacing at the rear ends of the troughs remains unchanged in all positions of swinging movement of the units so that the dimensions of the discharge zone into which the crops are delivered by the units may remain constant. Individual sets of disc cutters serve as the cutting apparatus for the row units and are driven by the same mechanism that operates the conveyors. Intermeshing gears of the drive walk around one another without disengagement during adjustable swinging of the units, and a hood between the units expands and contracts during swinging to present a continuous closed surface between the units regardless of their relative angular positions.

20 Claims, 7 Drawing Figures

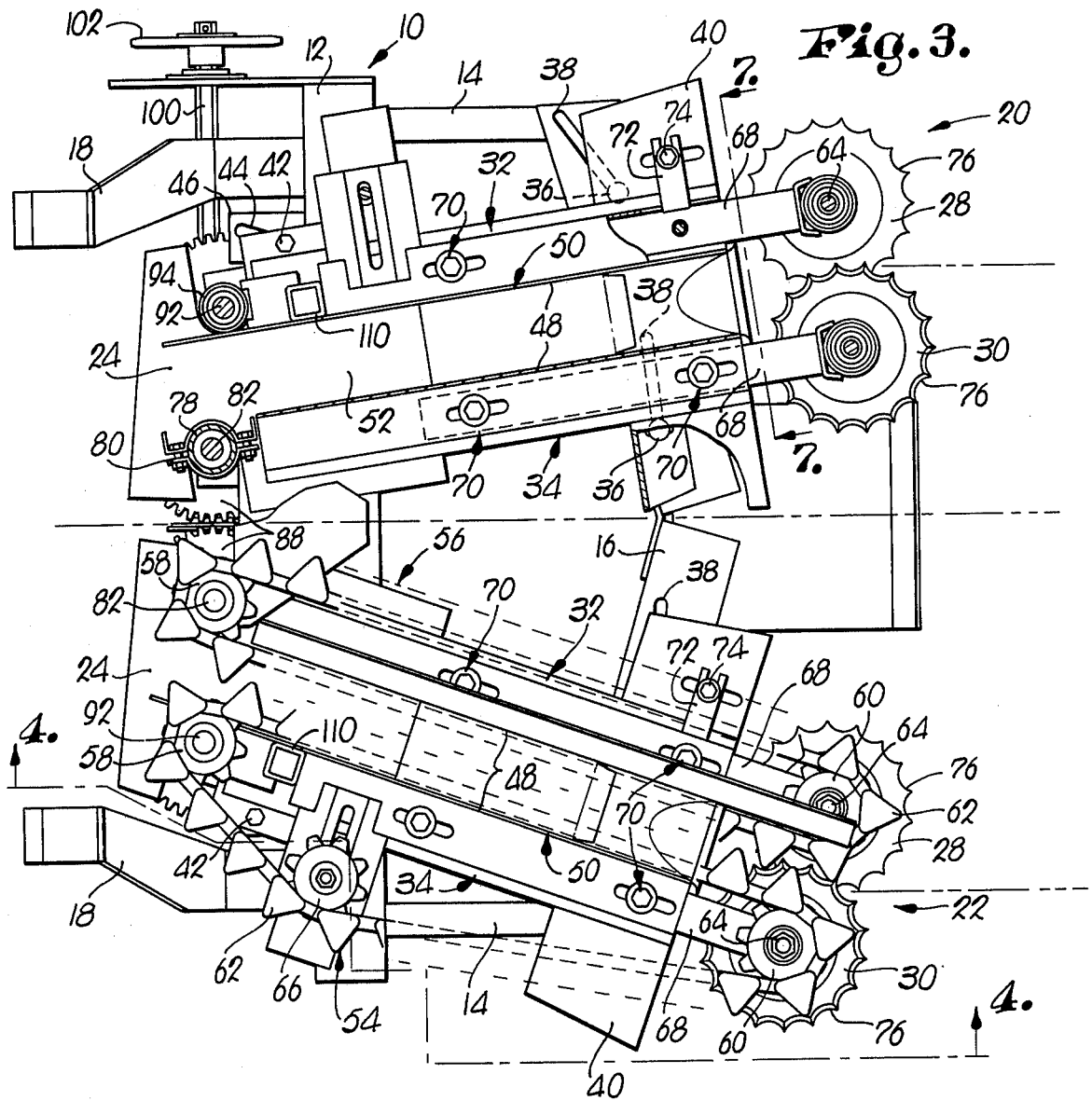

ADJUSTABLE ROW SPACING FORAGE HEAD

The operator of a forage harvester is frequently confronted with different row spacing as he moves from one field to another, and unless he somehow compensates for such differences, the crops are not likely to be aligned properly with the passages and conveyors of the harvester that move the crops upwardly and rearwardly to chopping mechanism after the crops have been severed from the ground. Various efforts have heretofore been made to remedy this problem by making the areas between adjacent snouts of the harvester overly large at their leading ends to accept many different row spacings, by providing attachments at the leading ends of the snouts for guiding offset rows into the cutters and conveyors, or by making the crop passages adjustably wider or narrower depending upon the row spacing encountered.

These efforts have been only marginally acceptable because, in most instances, they either adversely affect the smooth, uninterupted, rearward flow of crops into the passages and ultimately into the chopping mechanism, or are too complicated for rapid and easy adjustment or installation, or a combination of both. And since the crops are normally funnelled from widely spaced rows into a relatively narrow discharge zone at the chopping mechanism, which in itself tends to present problems of clogging and crop entanglement, what the operator does at the front of the machine to compensate for row spacing variations can quite easily have an immediate and direct impact upon crop flow at the discharge zone. Further, since it is not desirable to go to the effort and expense of changing the dimensions of the chopping mechanism each time different row spacings are encountered, the operator is faced with keeping the spacing between crop passages unchanged at their rear ends, regardless of what is done at the front of such passages to accommodate row spacing changes.

Accordingly, one important object of the present invention is to provide a harvester construction in which individual row units, each having its own crop passage, cutting means and conveyors, are selectively swingable toward and away from one another to vary their spacing at their forward ends while keeping the width of their passages and their spacing constant at their rear ends.

Another important object of this invention is to provide such adjustment through the simple expedient of loosening a few bolts and swinging the snouts associated with the crop passages toward or away from one another in an amount necessary to provide the encountered row spacing.

A further important object of the instant invention is the provision of a hood between swingable row units that can expand and contract as necessary in order to provide a continuous closed surface between the units in all positions of swinging movement.

Yet another important object of the invention is to avoid the need for disconnecting, adjusting or otherwise manipulating the drive for the operating components of the harvester in order to prevent its interference with free swinging of the row units.

Additionally, an important provision of the invention is to provide each row unit with its own individual cutting means, mechanically separated from those of other row units, such that the respective cutting means in no way interfere with or complicate swinging of the units for row spacing adjustment.

In the drawings:

FIG. 3 is a view of the head with its fender and hood structure removed and parts shown in cross section to reveal details of construction, one of the row units being swung inwardly to its furthest extent and the other swung outwardly to its furthest extent;

FIG. 4 is a primarily elevational view of the head taken along line 4—4 of FIG. 3;

Figure 1:
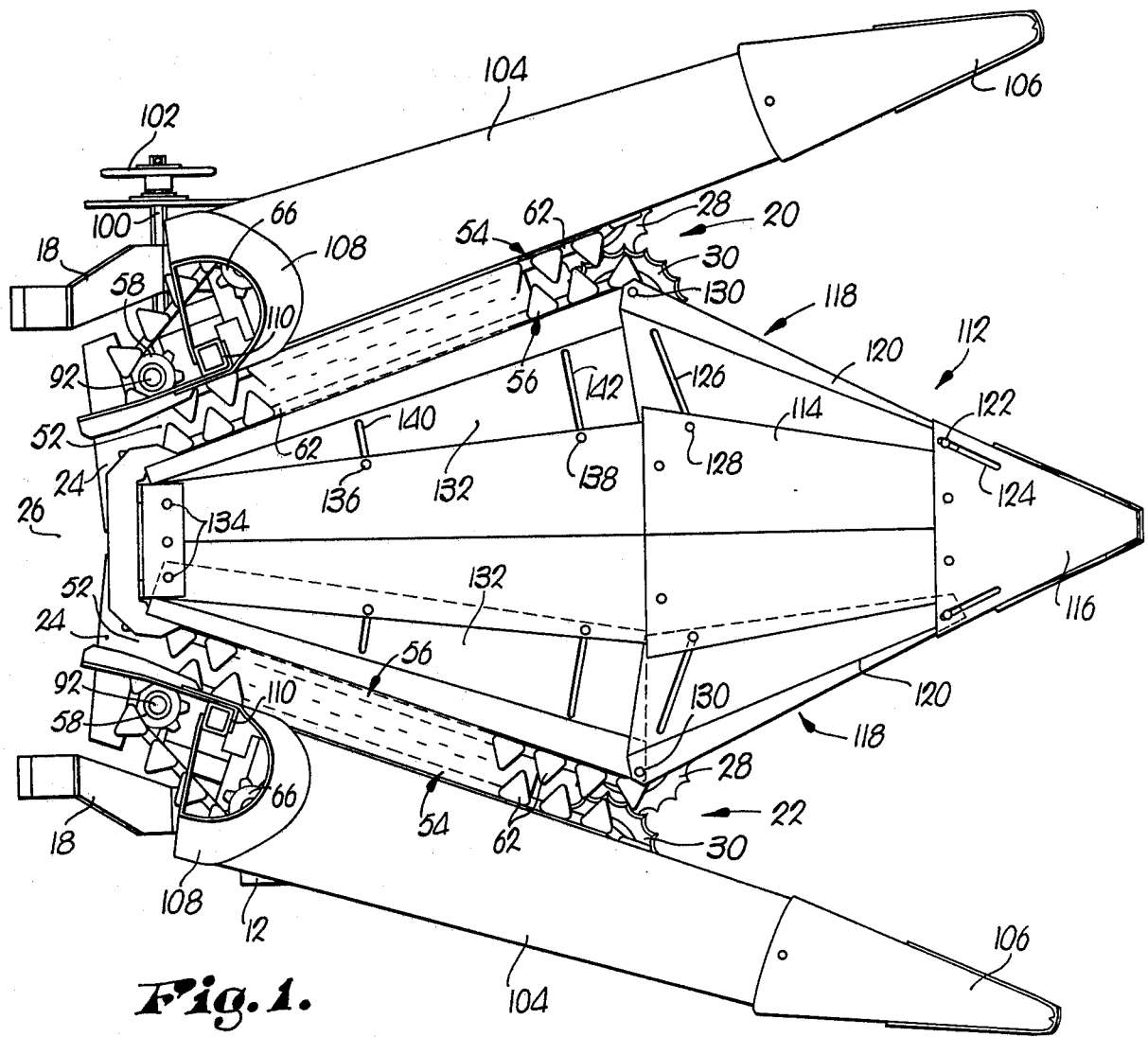
FIG. 1 is a top, plan view of a forage head embodying the principles of the present invention.

For purposes of illustration only, the principles of the present invention have been embodied in a 2-row harvesting head, but it will of course be understood that they apply equally to multi-row heads of any size. With this in mind, then, and with initial reference to FIGS. 2, 3 and 6, it will be seen that the harvesting head has a frame 10 which includes a main transverse box beam 12, a pair of arms 14 extending forwardly from beam 12 at its opposite ends, and a generally forwardly arched angle beam 16 that bridges the two arms 14 at their forwardmost ends. A pair of mounting arms 18 are inclined upwardly in a rearward direction from acrossbeam 12 at longitudinally spaced locations thereon for attaching the head to a self-propelled tractor or a towable frame as may be desired.

Swingably mounted on the frame 10 is a pair of identical row units 20 and 22 (except for their right and left hand natures). Each unit 20, 22 has a floor 24 that extends practically the full length of the units 20, 22 from rear discharge zone 26 to a forward point just behind a pair of crop severing discs 28 and 30. A pair of elongated, laterally spaced apart mounts 32 and 34 overlie the floor 24 in parallel relationship to one another and at their forwardmost ends support the discs 28, 30 for rotation about generally upright axes. Adjacent their front ends but behind the discs 28 and 30, the amounts 32, 34 and floor 24 are adjustably fastened to the arched beam 16 of frame 10 through carriage bolts 36 (FIGS. 3 and 4). The bolts 36 extend through elongated slots 38 in the top of angle beam 16 and through holes in the bottom of C-shaped, formed pieces 40 (viewing FIG. 4) whose upper surfaces define the floor 24 in that part of the units 20, 22. A third bolt 42 for each unit 20, 22 (FIGS. 3, 4, 5 and 6) releasably secures the floor 24 in place on the frame 10, the bolt 42 extending through a slot 44 (FIGS. 3 and 6) in a lug 46 extending rearwardly from the box beam 12.

The inner walls 48 of each pair of mounts 32, 34 serve as the sides of a crop transfer trough 50 that is bounded along its bottom by floor 24 and which defines an elongated, generally fore-and-aft extending passage 52 extending the full length of trough 50. Row crops severed by discs 28 and 30 are advanced upwardly and rearwardly toward discharge zone 26 through the troughs 50 by cooperating conveyors 54 and 56 disposed on opposite sides of and along the troughs 50, each conveyor 54, 56 including a pair of rotatable sprocket members 58 and 60 at opposite ends of trough 50 and an endless, flexible, lugged chain element 62 looped around sprockets 58 and 60. The front sprockets 60 share a common axis of rotation and mounting shaft 64 with their corresponding discs 28 or 30 such that both are driven by movement of the chain 62.

Figure 7:
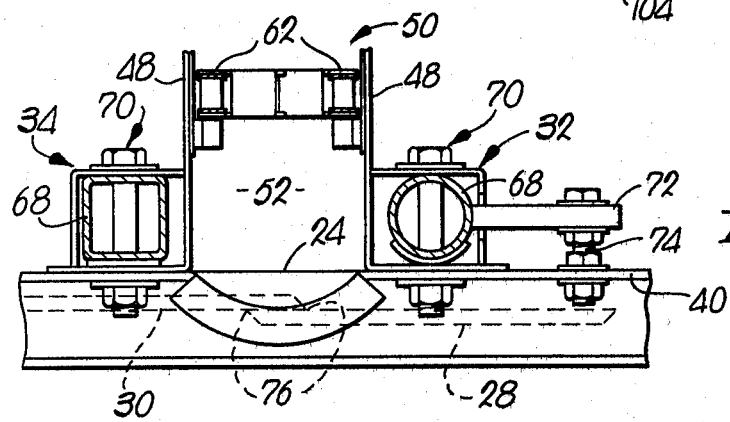
FIG. 7 is a cross-sectional view of one row unit taken along line 7—7 of FIG. 3.

The conveyor 54 in each case has a third sprocket 66 (FIGS. 1, 2 and 3) which may be adjusted laterally relative to its mount 32 in order to maintain proper tension on the chain 62. Forming a part of each mount 32, 34 is a tube 68 which carries the shaft 64, disc 28 or 30, and sprocket 60 and which may be telescoped fore-and-aft to also control the tension of chain 62. Such telescoping action is controlled by a bolt and slot arrangement 70 for each member 32, 34 (FIGS. 3, 4, and 7) and, as shown in FIG. 7, the tube 68 of each mount 32 may be rocked about its longitudinal axis through a laterally extending crank 72 and an adjustment bolt 74 connecting crank 72 with C-shaped piece 40. In this manner the overlapping discs 28 and 30 may be maintained parallel to one another to assure a proper shearing action by their peripheral cutting edges 76.

Each row unit 20, 22 is swingably mounted on an upright, tubular pivot post 78 (FIGS. 3 and 5) by a clamp 80 that slides around post 78 during swinging movement of the units 20, 22. An upright shaft 82 is coaxially journalled for rotation within each post 78 and carries at its upper end the sprocket 58 of conveyor 56. Consequently, the axis of swinging movement of each row 20, 22, coincides with the axis of rotation of the sprocket 58 of each conveyor 56.

The opposite lower end of each shaft 82 carries a composite gear 84 having integral bevel and spur sections 86 and 88 respectively. The spur section 88 meshes with an adjacent spur gear 90 carried on the lowermost end of an upright shaft 92 which is journalled within another upright tubular post 94 and which carries at its uppermost end the sprocket 58 of outer conveyor 54. The post 94, contrary to the post 78, is rigidly secured to the floor 24 for swinging movement with the latter such that shaft 92, its spur gear 90 and its sprocket 58 orbit around the axis of post 78 during row spacing adjustment.

Figure 5:
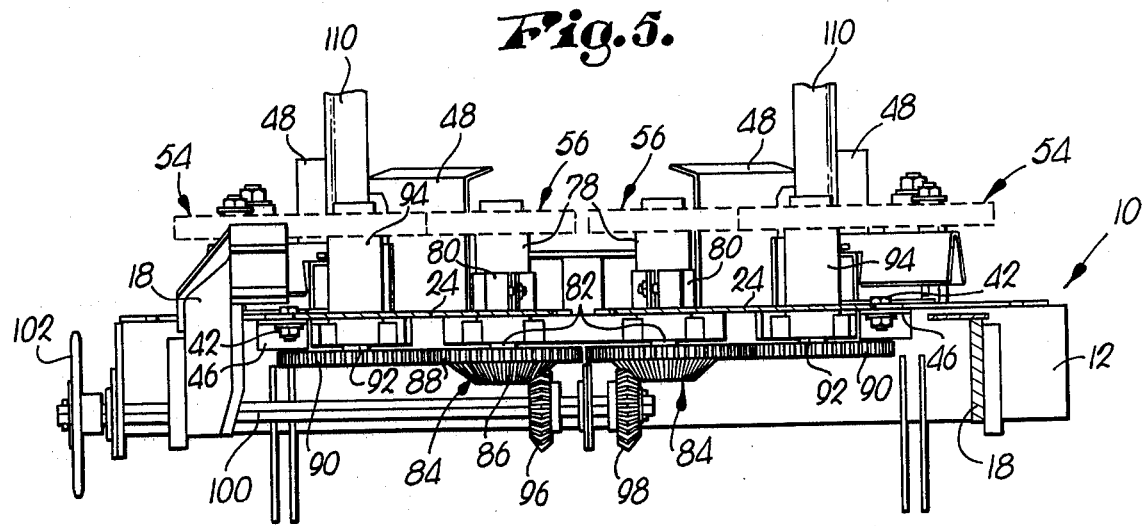
FIG. 5 is a rear end elevational view of the head.
Figure 6:
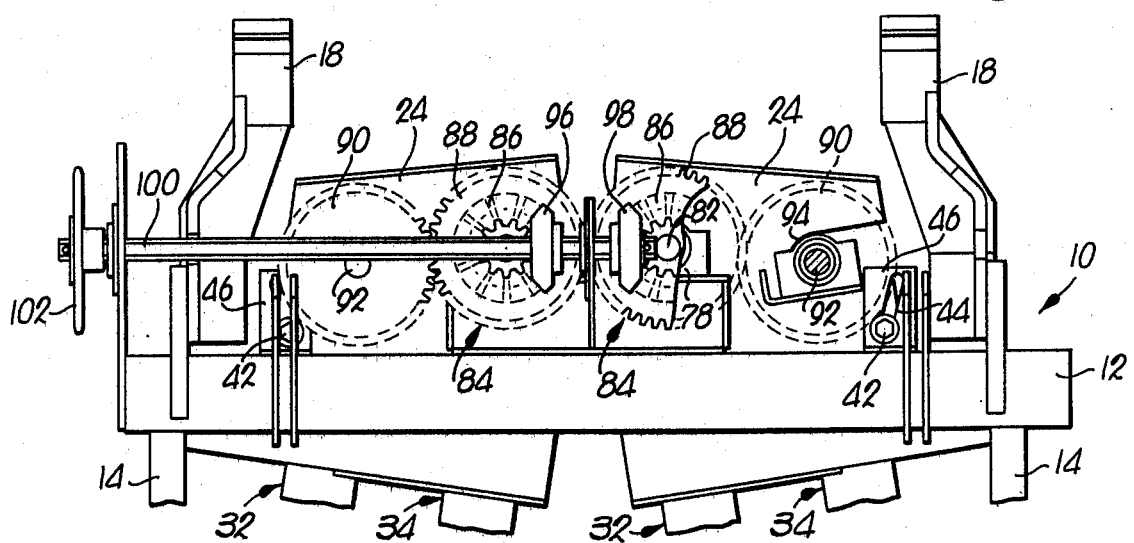
FIG. 6 is a fragmentary bottom view of the head illustrating details of the drive.

Immediately below the composite gears 84, as illustrated best in FIGS. 4, 5 and 6, a pair of bevel gears 96 and 98 mesh with the bevel sections 86 of composite gears 84. Bevel gears 96, 98 are fixed to a common hexagonal drive shaft 100 that extends laterally from approximately the center of the harvesting head outwardly beyond the left side of the head viewed from the rear of the latter as in FIG. 5. Shaft 100 in turn carries an outermost sprocket 102 which may receive driving power from a prime mover (not shown) on the tractor or frame to which the harvesting head is attached.

Figure 2:
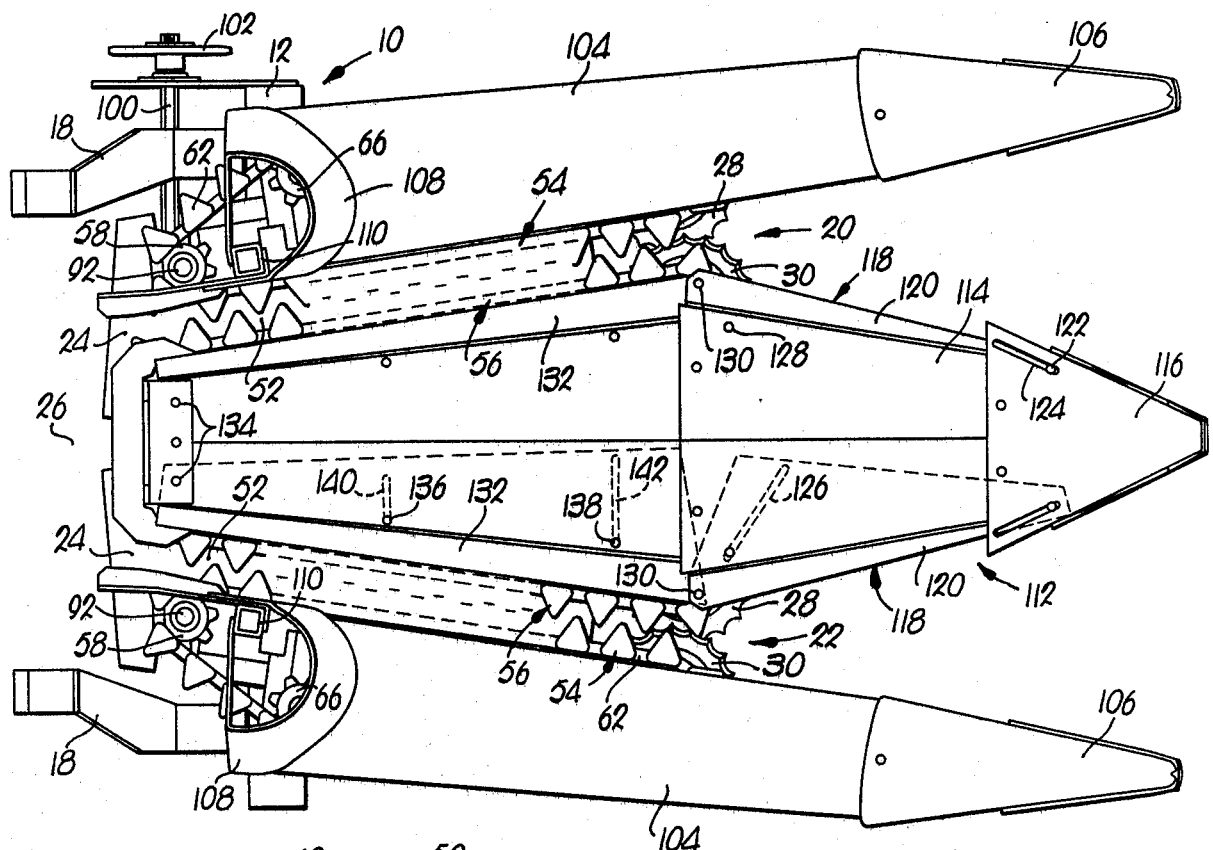
FIG. 2 is a view of the head similar to FIG. 1 but with the row units shifted toward one another to accommodate decreased row spacing.

With particular reference now to FIGS. 1 and 2, each outer conveyor 54 is housed beneath a fender 104 having a snout 106 at its forwardmost end. Rounded columns 108 rise from fenders 104 adjacent their rearmost ends, and each column 108 houses a upright 110 that serves as a support for overhead stalk guidance structure (not shown) that assures the crop stalks are properly presented to the discharge zone 26.

A hood 112 spans the distance between inner conveyors 56 of the row units 20 and 22 and is designed to readily expand or contract when the snouts 106 are swung between their outermost positions in FIG. 1 and their innermost positions in FIG. 2. A stationary panel 114 of hood 112 extends for substantially the full fore-and-aft length of the latter, the forwardmost end of panel 114 having a forwardly tapering nose 116 which projects slightly ahead of the snouts 106 in all positions of their swinging movement. Swingable panels 118 on opposite sides of stationary panel 114 may be telescoped below or extended outwardly beyond the stationary panel 114 in order to render hood 112 expanded or contracted. Each swingable panel 118 is in two parts, having a forward part 120 provided with a pin 122 that rides in a fore-and-aft extending slot 124 in nose 116, a generally laterally extending slot 126 adjacent its rear end which receives a pin 128 on stationary panel 114, and a hinge pin 130 secured to the front end of mount 34. The rear part 132 of each swingable panel 118 is swingably attached at one end to the hinge pin 130, is pivotally secured at its opposite end to the stationary panel 114 through a pivot 134 and is guided in its lateral swinging movement by pins 136 and 138 in stationary panel 114 which are received in lateral slots 140 and 142 in part 132. Accordingly, as the hood 112 is expanded and contracted, the swingable panels 118 buckle and unbuckle about hinge pins 130 to vary the shape of hood 112 between a diamond configuration in FIG. 1 and a generally rectangular configuration in FIG. 2. The guide pins 122, 128, 136 and 138 may be in the form of releasable bolt assemblies that are tightened when no telescoping is desired and are loosened when row spacing adjustment is required.

Although in FIG. 4 the harvesting head has been shown in a generally horizontal plane, it is to be understood that when attached to the source of motive power, the head projects downwardly and forwardly therefrom. Hence, the troughs 50 and their conveyors 54, 56 lead upwardly and rearwardly from cutting discs 28, 30 at this time. Moreover, regardless of whether the row units 20 and 22 are spread apart as in FIG. 1 or are closer together as in FIG. 2, it is apparent that they diverge downwardly and forwardly from zone 26 such that crops severed by discs 28, 30 are funnelled back through the discharge zone 26.

With the row units 20 and 22 spread apart as in FIG. 1, the operator is prepared to accommodate row spacing which generally corresponds to the distance between units 20 and 22 at their discs 28, 30. If the operator then encounters a substantially smaller row spacing, this can be readily accommodated by merely loosening the four carriage bolts 36 (FIGS. 3 and 4) and the two positioning bolts 42 (FIGS. 3, 4, 5 and 6), grasping the snouts 106, and shifting the two toward one another so as to bring the row units 20 and 22 closer together. Depending upon the row spacing encountered, it may be necessary to shift the row units 20 and 22 to their closest positions illustrated in FIG. 2. It is then only necessary to retighten carriage bolts 36 and positioning bolts 42, whereupon the operator is immediately ready to resume operation. Of course, if pins 122, 128, 136 and 138 take the form of bolt assemblies, they must be loosened before shifting the snouts 106 and then retightened following adjustment.

The hood 112 easily contracts during such adjustment since the swingable panels 118 are free to slide easily into position beneath the stationary panel 114. Thus, the hood 112 presents a continuous closed surface between the row units 20 and 22 regardless of their relative angular positions.

It is important also to recognize that the operator need not in any way disconnect or adjust the drive for the operating components of the head as a requisite for swinging the row units 20 and 22. The bevel gear sections 86 of composite gears 84 simply "walk" around their driving bevel gears 96 and 98 during such movement until the desired spacing is achieved. At no time do the bevel gears 96, 98 and bevel sections 86 become disengaged. The spur gears 90 remain engaged with the spur sections 88 of composite gears 84 during such movement since spur gears 90 orbit about the axis of composite gears 84.

Having thus described the invention, what is claimed as new and desired to be secured by Letters Patent is:

1. In a mobile crop harvester:
    a frame;
    a pair of normally inclined row crop harvesting units, each of said units having mechanism which includes:
    means defining an elongated, fore-and-aft extending passage and having a normally elevated rear discharge end and a normally lowered front inlet end,
    cutting means at said inlet end for severing standing crops approaching the passage as the harvester advances, and
    a pair of opposed cooperating conveyors along said passage-defining means for elevating the crops severed by said cutting means through said passage and out said discharge end;
    drive means on said frame for said mechanisms; and
    means mounting said units on said frame for lateral swinging movement relative to one another to permit selective changing of the spacing of the passages at said inlet ends without changing the spacing at said discharge ends,
    said conveyors being swingable with their respective units and each including a pair of rotatable members at said opposite ends and an endless, flexible element looped about said members, at least one of said units having its axis of swinging movement coinciding with the axis of rotation of one of the members at said discharge end.

2. In a crop harvester as claimed in claim 1, wherein both of said units are swingable.

3. In a crop harvester as claimed in claim 1; and a hood connected between said units, expandable and contractable during said swinging of the units.

4. In a crop harvester as claimed in claim 3 wherein said hood includes a stationary central panel and a pair of outer panels on opposite sides of the central panel swingable with their respective units.

5. In a crop harvester as claimed in claim 4, wherein each outer panel is hinged centrally for buckling and unbuckling about an axis perpendicular to the panel during expansion and contraction of the hood.

6. In a crop harvester as claimed in claim 1, wherein each unit has an inner and an outer conveyor, said one member being the rear member on the inner conveyor.

7. In a crop harvester as claimed in claim 1, wherein said drive means includes a transverse drive shaft, an upright driven shaft carrying said one rear member, and a pair of intermeshing bevel gears between said shafts permitting the bevel gear of said driven shaft to walk around the bevel gear of said drive shaft during swinging of said one unit.

8. In a crop harvester as claimed in claim 7, wherein said drive shaft is common to both units with each having an upright shaft driven from said drive shaft through intermeshing, relatively walkable bevel gears.

9. In a crop harvester as claimed in claim 7, wherein said drive means further includes a second upright driven shaft carrying the other rear member, and intermeshing gears on said two driven shafts.

10. In a crop harvester as claimed in claim 1, wherein each of said units includes a pair of elongated, fore-and-aft extending and laterally spaced apart mounts for its conveyors, said conveyors being supported by said mounts and the latter being rigidly interconnected for swinging in unison.

11. In a crop harvester as claimed in claim 10, wherein said mounts cooperate to define said passage therebetween.

12. In a crop harvester as claimed in claim 10, wherein the axis of swinging movement of each unit is located at the rear end of one of its mounts, the other mount being orbital about said axis of swinging movement.

13. In a crop harvester as claimed in claim 10, wherein said cutting means includes a pair of cooperating cutter components at the front ends of each pair of mounts, at least one component of each pair being rotatable.

14. In a crop harvester as claimed in claim 13, wherein said cutter components comprise rotary generally flat discs having overlapping, peripheral cutting edges.

15. In a crop harvester as claimed in claim 14, wherein at least one disc of each pair is provided with means for selectively tilting the same relative to the other disc of the pair for varying the shearing action between the discs.

16. In a crop harvester as claimed in claim 10, and means releasably holding said mounts in a selected angular position of swinging movement.

17. In a crop harvester as claimed in claim 10, wherein said pair of guide members at opposite ends of said passage are rotatably carried at opposite ends of the corresponding mount.

18. In a crop harvester as claimed in claim 17, wherein said drive means includes a transverse drive shaft, an upright driven shaft carrying said one rear member, and a pair of intermeshing bevel gears between said shafts permitting the bevel gear of said driven shaft to walk around the bevel gear of said drive shaft during swinging of said one unit.

19. In a crop harvester as claimed in claim 18, wherein said drive shaft is common to both units with each having an upright shaft driven from said drive shaft through intermeshing, relatively walkable bevel gears.

20. In a crop harvester as claimed in claim 19, wherein said drive means further includes a second upright driven shaft carrying the other rear member, and intermeshing gears on said two driven shafts.

* * * * *